(No Model.)

A. DEWEY & J. SHORT
GRAIN HULLER.

No. 346,738. Patented Aug. 3, 1886.

WITNESSES:
Fred. G. Dieterich
P. B. Turpin.

INVENTOR:
A. Dewey
J. Short
BY Munn & Co.
ATTORNEYS.

N. PETERS, Photo-Lithographer, Washington, D. C.

United States Patent Office.

ALVAH DEWEY AND JOB SHORT, OF CANNELTON, IND., ASSIGNORS OF ONE-THIRD TO ISAAC DUNN AND THOMAS CULLEN, BOTH OF SAME PLACE.

GRAIN-HULLER.

SPECIFICATION forming part of Letters Patent No. 346,738, dated August 3, 1886.

Application filed January 25, 1886. Serial No. 189,735. (No model.)

*To all whom it may concern:*

Be it known that we, ALVAH DEWEY and JOB SHORT, of Cannelton, in the county of Perry and State of Indiana, have invented a new and useful Improvement in Grain-Hullers, of which the following is a description.

Our invention is an improvement in machines for hulling grain, and is especially intended for the treatment of corn or whole hominy.

The invention consists in the novel construction, combination, and arrangement of parts hereinafter described and claimed.

Figure 1:
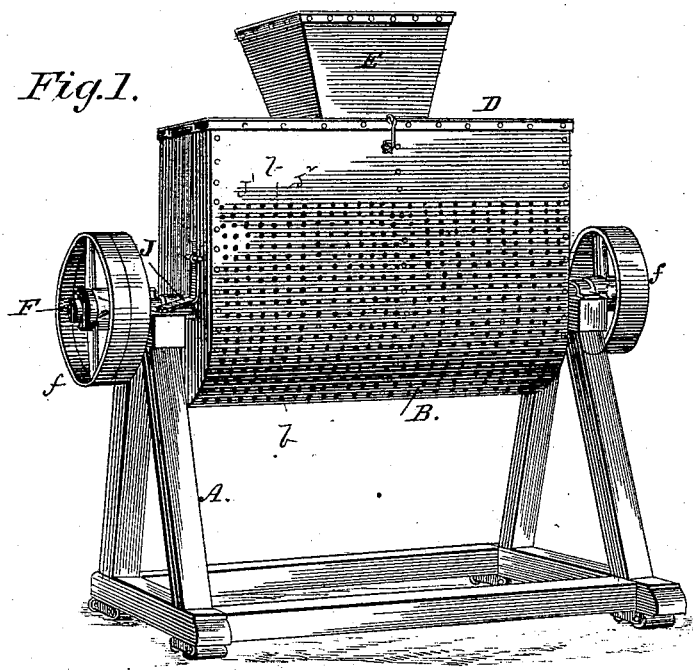
Figure 2:
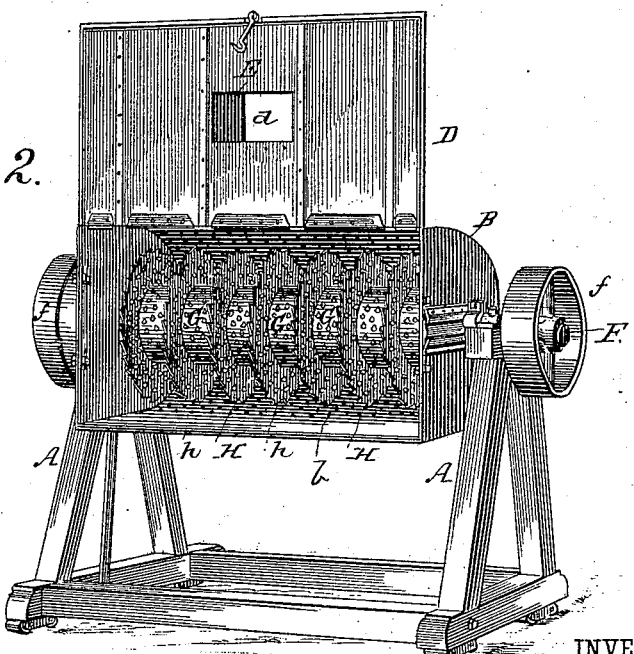

In the drawings, Figure 1 is a perspective view of the machine as ready for use; and Fig. 2 is a similar view showing the machine as ready for dumping the cleaned grain.

On a suitable frame, A, is supported a receiver or body, B, having its bottom curved or rounded, and provided through said bottom and up along its sides with perforations $b$, fitted to permit the passage of the hulls and other particles removed from the grain. The matters discharged through these perforations may fall into a sink or trough located below the body or casing, from which trough they may be conveyed to the kiln-dryer or other part of the mill desired.

The top D or the lid may be hinged at one edge to the body, and provided with an opening, $d$, and a hopper, E, above and surrounding the opening, as shown. The shaft F extends longitudinally through the box and may be turned by hand, but is preferably provided with a suitable pulley, $f$, by means of which it may be geared with a suitable power. On this shaft F, within the box or case, we secure cylinders G and disks H, arranged alternately, as shown, the disks being held between the meeting ends of two adjacent cylinders. The surfaces of the cylinders as well as the side faces of the disks, are roughened, forming, practically, rasps, which, by contact with the grain, serve to loosen and free the husks. The disks have their edges formed with teeth $h$ like those of a saw.

In operation the grain is fed into the box or case and the shaft is rapidly revolved. The teeth and rasp-like surfaces quickly remove the husks and clean the grain, such husks passing through the perforations into the trough below the machine. The hulled, cleaned, and scoured grain may be discharged at one end of the machine by providing a suitable discharge-opening; or the discharge may be accomplished by stopping the machine and raising the lid or cover, when the box or case may be tilted and the contents discharged, as will be understood from Fig. 2. To this end the box or case is pivotally supported, preferably on the shaft, and a latch, J, is provided for securing the box in upright position. This latch, in the construction shown, is a hasp pivoted to the framing and having a slot, J', fitted over a staple and secured by a pin, $J^2$, as will be understood from Fig. 1.

The cylinders and saws may be removed and replaced by others.

Having thus described our invention, what we claim as new is—

A machine, substantially as described, comprising a perforated box or casing, the shaft supported therein, the cylinders supported on the shaft, and having roughened surfaces, and the disks secured between the meeting ends of the adjacent cylinders, and having roughened surfaces and saw-like edges, substantially as set forth.

ALVAH DEWEY.
JOB SHORT.

Witnesses:
MIKE CONWAY,
WILL HINDEN.